Patented Apr. 18, 1933

1,904,190

UNITED STATES PATENT OFFICE

WILLY BECHER, OF BUSSUM, NETHERLANDS

PROCESS OF MANUFACTURING CHLORINE DIOXIDE

No Drawing. Application filed August 25, 1930, Serial No. 477,795, and in the Netherlands August 26, 1929.

In the literature two processes of manufacturing chlorine dioxide are described.

One of the said processes is based on the decomposition of alkali metal chlorates by concentrated sulphuric acid; with a view to the danger of explosions occurring when applying this process in the way practiced until now the same is not suitable for practical purposes.

This difficulty does not occur in the second process according to which organic reducing agents are caused to react with alkali metal chlorates, e. g. oxalic acid (Bray, "Zeitschrift für physikalische Chemie" vol. 54, page 574) or 95% formic acid (Hofman, "Berichte" vol. 48, page 816).

The last mentioned processes can be exercised without any explosion occurring; they are, however, too expensive for preparing chlorine dioxide on a technical scale with a view to the large consumption of reducing agents (according to Bray 4.5 mol. oxalic acid, according to Hofman about 50 mol. of formic acid are used per mol. of potassium chlorate).

It has already been proposed to enable the manufacture of chlorine dioxide on a technical scale by combining both processes. A cheap manufacturing method might be possible by causing the alkali metal chlorate to react with slightly more than the theoretical amount of reducing agent and the amount of sulphuric acid, necessary for converting the metal of the chlorate in bisulphate. Oxalic acid, besides formic acid, can be used for this process. Carbohydrates such as sugar, wood, starch and cellulose are suitable. The use of the last mentioned substances however has the drawback that the danger that explosion will occur is considerably increased and that moreover the output of chlorine dioxide is much more diminished than by application of the first mentioned substances. The gas mixture obtained in this way contains a considerable amount of chlorine, because part of the chloric acid is immediately reduced to chlorine whereas almost pure chlorine dioxide is obtained if no reducing agents are used. The yield of chlorine dioxide when using reducing agents is still further decreased because the sulphuric acid must be used in a diluted state, which has an unfavourable influence on the reduction of the chloric acid to chlorine dioxide.

The object of the invention is a cheap and completely safe process of manufacturing chlorine dioxide from chlorates and sulphuric acid. I found that the explosive properties of the chlorine dioxide depend in a large measure on the temperature. The critical temperature below which practically no explosion occurs is about 65° C.: A satisfying yield of chlorine dioxide, however, is only obtained at temperatures in the neighbourhood of this critical temperature (about 60° C.).

In the known process a local rise of the temperature till above the critical value will easily occur, heat being liberated by the reaction of the concentrated sulphuric acid on the alkali metal chlorate, so that explosions will result.

According to the invention a local superheating of parts of the mixture is avoided by mixing an alkali metal chlorate, if desired with addition of water or another liquid, with inorganic substances which are indifferent to chlorates and sulphuric acid in such a way that the mixture constitutes a relatively firm, dry mass and causing this mixture in the form of smaller or larger lumps to react with sulphuric acid, the said lumps maintaining their form during the reaction or dissolving or disintegrating more slowly than the chlorate reacts.

The invention can be practised in different ways which are based on the above described principle.

According to an embodiment of the invention the alkali metal chlorate is mixed with substances having the property to harden with water, thereby giving a firm, solid mass e. g. gypsum.

According to another embodiment of the invention finely divided substances are used which are adapted to be formed to bodies of a sufficient firmness to give the desired result, without however undergoing any reaction. Furthermore the alkali metal chlorate in the form of a solution may be absorbed by a porous material which afterwards is desiccated totally or partly.

If necessary the mass so obtained is broken, and it will now give with sulphuric acid a regular development of chlorine dioxide, without any explosion occurring, if the temperature is kept below 65° C.

When using concentrated sulphuric acid a cooling may be applied if desired at the beginning of the reaction. In order to promote the development a gas may be introduced which is indifferent with regard to the substances used so that the escaping of the chlorine dioxide which is fairly soluble in sulphuric acid is facilitated; at the same time the obtained chlorine dioxide is diluted by the indifferent gas. Also one or more salts may be added to the mixture of alkali metal chlorate with the inorganic substances which salts develop indifferent gases (e. g. carbonic acid) with the sulphuric acid, by which the development and the escape of the chlorine dioxide are promoted.

The above described process in which indifferent gases are introduced, may be improved by saturating the gas to be introduced totally or partly with gaseous organic reducing agents, such as formic acid or formaldehyde. I have found that in this way the drawbacks connected with the usual way of applying reducing agents, namely the smaller yield of chlorine dioxide by reduction of the chlorine acid to chlorine, are removed for the greater part. The gas obtained in this way contains 94–96% $Cl_2$ and only 4–6% Cl.

Finally the process may still be improved by adding catalysts. It has been found that small quantities of vanadium, manganese, iron, or osmium oxide act as catalysts and accelerate the reaction.

With the above described processes of preparing chlorine dioxide the possibility of explosions is absolutely excluded. The mixture prepared according to the invention may even be heated with sulphuric acid to 100° C. without an explosion taking place, provided that care is taken that no important quantities of chlorine dioxide remain present in the reaction vessel in concentrated condition. Only a violent reaction takes place accompanied by a violent evolution of gas, a large part of the chlorine dioxide being decomposed into chlorine and oxygen.

*Example I.*—Two parts of potassium chlorate are formed to a paste with one part of gypsum and water. The excess of water being removed if necessary by drying, the gypsum is caused to harden by which a hard dry mass is obtained. If desired the latter is broken and then treated with sulphuric acid for preparing the chlorine dioxide, care being taken that the temperature will not rise above 65° C.

*Example II.*—To a mixture of sodium chlorate and gypsum, sodium bicarbonate or chalk, and water is added. The excess of water is removed from the mass after which it is allowed to set. The product so obtained is used for the development of chlorine dioxide in the way as described in Example I.

*Example III.*—Two parts of potassium chlorate mixed with one part of gypsum are brought into the shape of solid lumps in the way as described in Example I. The same are brought together in the apparatus for the development of chlorine dioxide with sulphuric acid; through the liquid a current of air is conducted which previously passes through a solution of formaldehyde.

*Example IV.*—To a mixture of two parts of potassium chlorate and one part of gypsum 0.0002% osmium-oxide is added. The further treatment takes place according to Example I.

*Example V.*—Pumice is saturated with a concentrated solution of potassium chlorate in water and desiccated by heating. In order to prepare chlorine dioxide the desiccated pumice is treated with concentrated sulphuric acid at a temperature not rising above 65° C.

If desired the above described processes may be combined with the application of organic reducing agents which is known in itself by adding to the mixture of the inorganic substance and chlorate oxalic acid, formic acid, carbohydrates etc. In this case the treatment may take place preferably with moderately diluted sulphuric acid.

I claim:

1. A process for preparing chlorine dioxide from alkali metal chlorates and sulphuric acid comprising mixing the alkali metal chlorate with inorganic substances indifferent to alkali metal chlorates and sulphuric acid to form a mixture in solid lumps and then subjecting said lumps to the action of sulphuric acid.

2. A process for preparing chlorine dioxide from alkali metal chlorates and sulphuric acid comprising mixing the alkali metal chlorate with gypsum and water, then allowing the mixture to set and then subjecting the mass to the action of sulphuric acid.

3. A process for preparing chlorine dioxide from alkali metal chlorates and sulphuric acid comprising impregnating a porous material with a solution of an alkali metal chlorate, then desiccating the mass so formed and then subjecting said mass to the action of sulphuric acid.

4. A process for preparing chlorine dioxide from alkali metal chlorates and sulphuric acid comprising mixing the alkali metal chlorate with inorganic substances indifferent to alkali metal chlorates and sulphuric acid to obtain the mixture in the form of solid lumps, then subjecting said lumps to the action of sulphuric acids and introducing gases indifferent to chlorine dioxide during the reaction of said lumps with said sulphuric acid.

5. A process for preparing chlorine dioxide from alkali metal chlorates and sulphuric acid comprising mixing an alkali metal chlorate with gypsum and water, then allowing said mixture to set, then subjecting the mass formed from said mixture to the action of sulphuric acid and introducing gases non-reactive to chlorine dioxide during the reaction of said mass with said sulphuric acid.

6. A process for preparing chlorine dioxide from alkali metal chlorates and sulphuric acid comprising impregnating a porous material with a solution of an alkali metal chlorate, then desiccating the mass so formed, then subjecting said mass to the action of sulphuric acid and introducing gases non-reactive to chlorine dioxide during the reaction of said mass with said sulphuric acid.

7. A process for preparing chlorine dioxide from alkali metal chlorates and sulphuric acid comprising mixing the alkali metal chlorate with inorganic substances indifferent to alkali metal chlorates and sulphuric acid to obtain the mixture in the form of solid lumps, then subjecting said lumps to the action of sulphuric acids and introducing gases indifferent to chlorine dioxide during the reaction of said lumps with said sulphuric acid, and then saturating said gas introduced with an organic reduction agent in vapor condition.

8. A process for preparing chlorine dioxide from alkali metal chlorates and sulphuric acid comprising mixing an alkali metal chlorate with gypsum and water, then allowing said mixture to set, then subjecting the mass formed from said mixture to the action of sulphuric acid and introducing gases non-reactive to chlorine dioxide during the reaction of said mass with said sulphuric acid, and then saturating said gas introduced with an organic reduction agent in vapor condition.

9. A process for preparing chlorine dioxide from alkali metal chlorates and sulphuric acid comprising impregnating a porous material with a solution of an alkali metal chlorate, then desiccating the mass so formed, then subjecting said mass to the action of sulphuric acid and introducing gases non-reactive to chlorine dioxide during the reaction of said mass with said sulphuric acid, and then saturating said gas introduced with an organic reduction agent in vapor condition.

10. A process for preparing chlorine dioxide from alkali metal chlorates and sulphuric acid comprising mixing an alkali metal chlorate with inorganic substances indifferent to alkali metal chlorates and sulphuric acid to form solid lumps, incorporating at the same time in said mixture substances which when reacted with sulphuric acid will develop gases indifferent to chlorine dioxide, and then subjecting said lumps to the action of sulphuric acid.

11. A process for preparing chlorine dioxide from alkali metal chlorates and sulphuric acid comprising mixing the alkali metal chlorate with gypsum and water, incorporating therewith substances which when reacted with sulphuric acid will develop gases indifferent to chlorine dioxide, then allowing said mixture to set and then subjecting the mass to the action of sulphuric acid.

12. A process for preparing chlorine dioxide from alkali metal chlorates and sulphuric acid comprising mixing the alkali metal chlorate with inorganic substances indifferent to alkali metal chlorates and sulphuric acid to obtain a mixture in the form of lumps, adding small quantities of catalysts from a group consisting of vanadium, manganese, iron, and osmium oxides and then subjecting said lumps to the action of sulphuric acid.

13. A process for preparing chlorine dioxide from alkali metal chlorates and sulphuric acid comprising mixing an alkali metal chlorate with an inorganic substance indifferent to alkali metal chlorates and sulphuric acid, adding water thereto and then subjecting the lump so formed to the action of sulphuric acid.

In testimony whereof I affix my signature.
W. BECHER.